United States Patent
Kaushal et al.

(10) Patent No.: US 9,338,527 B2
(45) Date of Patent: *May 10, 2016

(54) DATA AND CALL ROUTING AND FORWARDING

(71) Applicant: Comcast Cable Communications, LLC, Philadelphia, PA (US)

(72) Inventors: Arvind Kaushal, Marlton, NJ (US); Jon Boone, Coatesville, PA (US); Sohel Khan, Philadelphia, PA (US); Louis Rubin, Ruskin, FL (US); Brett Sherman, Philadelphia, PA (US); Jaime Jimenez, Tinton Falls, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/575,118

(22) Filed: Dec. 18, 2014

(65) Prior Publication Data

US 2015/0103994 A1    Apr. 16, 2015

Related U.S. Application Data

(63) Continuation of application No. 13/855,153, filed on Apr. 2, 2013, now Pat. No. 8,948,366, which is a continuation of application No. 12/913,634, filed on Oct. 27, 2010, now Pat. No. 8,442,205.

(51) Int. Cl.
*H04M 7/00* (2006.01)
*H04Q 3/66* (2006.01)
(Continued)

(52) U.S. Cl.
CPC ................. *H04Q 3/66* (2013.01); *H04L 65/00* (2013.01); *H04L 65/1069* (2013.01); *H04Q 3/0016* (2013.01); *H04Q 3/0029* (2013.01); *H04W 4/16* (2013.01); *H04M 2203/15* (2013.01)

(58) Field of Classification Search
CPC ............................. H04Q 3/66; H04Q 3/0029
USPC ...................................................... 379/221.02
See application file for complete search history.

(56) References Cited

U.S. PATENT DOCUMENTS 5,781,620 A    7/1998    Montgomery et al.
6,977,933 B2    12/2005    Soncodi et al.
(Continued)

FOREIGN PATENT DOCUMENTS

WO    2005/112420 A1    11/2005
WO    2007042620 A1    4/2007
WO    2010073058 A1    7/2010

OTHER PUBLICATIONS

EP search Report—EP11186315—Date of completion of search May 29, 2012.

(Continued)

*Primary Examiner* — Creighton Smith
(74) *Attorney, Agent, or Firm* — Banner & Witcoff, Ltd.

(57) ABSTRACT

One or more aspects of the disclosure relate to various functions and processes related to routing of calls originating from other service providers. For example, a method includes receiving a request to route a call or a call session, such as a session initiation request, from a second service provider and proceeding to route the requested call or session through a call routing facility of the first service provider to a requested destination of the call. Routing the call through the call routing facility may include determining a service provider type and/or an origination number type for the call, determining routing information for the call using the type information, and causing routing of the call to a destination of the call based on the routing information. Further aspects of the disclosure relate to various functions and processes related to accessing routing data and/or information from a routing database.

20 Claims, 8 Drawing Sheets

(51) Int. Cl.
*H04L 29/06* (2006.01)
*H04W 4/16* (2009.01)
*H04Q 3/00* (2006.01)

(56) References Cited

U.S. PATENT DOCUMENTS

| | | |
|---|---|---|
| 7,804,816 B2 | 9/2010 | Low et al. |
| 2002/0196918 A1 | 12/2002 | Culli et al. |
| 2005/0243796 A1 | 11/2005 | Cope et al. |
| 2005/0249196 A1 | 11/2005 | Ansari et al. |
| 2006/0035623 A1 | 2/2006 | Senn et al. |
| 2009/0003561 A1 | 1/2009 | Patel |
| 2009/0245179 A1 | 10/2009 | Liu et al. |
| 2011/0149750 A1 | 6/2011 | Sharma et al. |
| 2011/0270766 A1* | 11/2011 | Ramakrishnan et al. ....... 705/80 |

OTHER PUBLICATIONS

Extended European Search Report—EP13163865.2—Mailing Date Jul. 26, 2013.
European Search Report—EP 15176141.8—Dated Oct. 7, 2015.

* cited by examiner

DATA AND CALL ROUTING AND FORWARDING

CROSS REFERENCE TO RELATED APPLICATIONS

The present application is a continuation of claims priority to U.S. application Ser. No. 13/855,153, filed Apr. 2, 2013, which is a continuation of U.S. application Ser. No. 12/913,634, filed Oct. 27, 2010 (now issued U.S. Pat. No. 8,442,205). Each of the above-mentioned application is hereby incorporated by reference here in its entirety.

BACKGROUND

Current telephony systems allow for the routing of calls based on a call type (e.g., local call, toll call, long distance call, international call, etc.). In such systems, the service provider may use the call type to determine the destination of the call and then cause the call to be routed. This may be sufficient for routing of calls that originate from the service provider's users (e.g., users, customers, subscribers, etc.). However, merely using the call type may be insufficient to route calls that originate elsewhere, such as from other service providers (e.g., wholesale carriers, telephony carriers, etc.).

SUMMARY

Some aspects of the disclosure relate to methods and systems for routing of calls originating from other service providers.

One or more aspects of the disclosure may relate to various functions and processes related to routing of calls originating from other service providers. For example, a method related to the routing of calls originating from another service provider may include receiving, at a computing device of a first service provider, a call session (e.g., a call session initiation request) from a second service provider. The first service provider and the second service provider may be different service providers. The method may also include determining at least one of a service provider type of the second service provider and an origination number type for the call session, determining routing information for the call session using at least one of the service provider type and the origination number type, and causing routing of the call session to a destination of the call session based on the routing information.

Further aspects of the disclosure may relate to various functions and processes related to accessing routing data from a database. For example, a system may manage the routing of calls using a shared infrastructure of a call routing facility. The system may assign one or more user labels to each user of the network and partition a routing database according to the assigned user labels. Such partitioning may allow for the separation and/or privacy of each user's data in a scalable database. In one example, the user labels may provide for a virtual private network service for the user over the shared routing infrastructure.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1A:
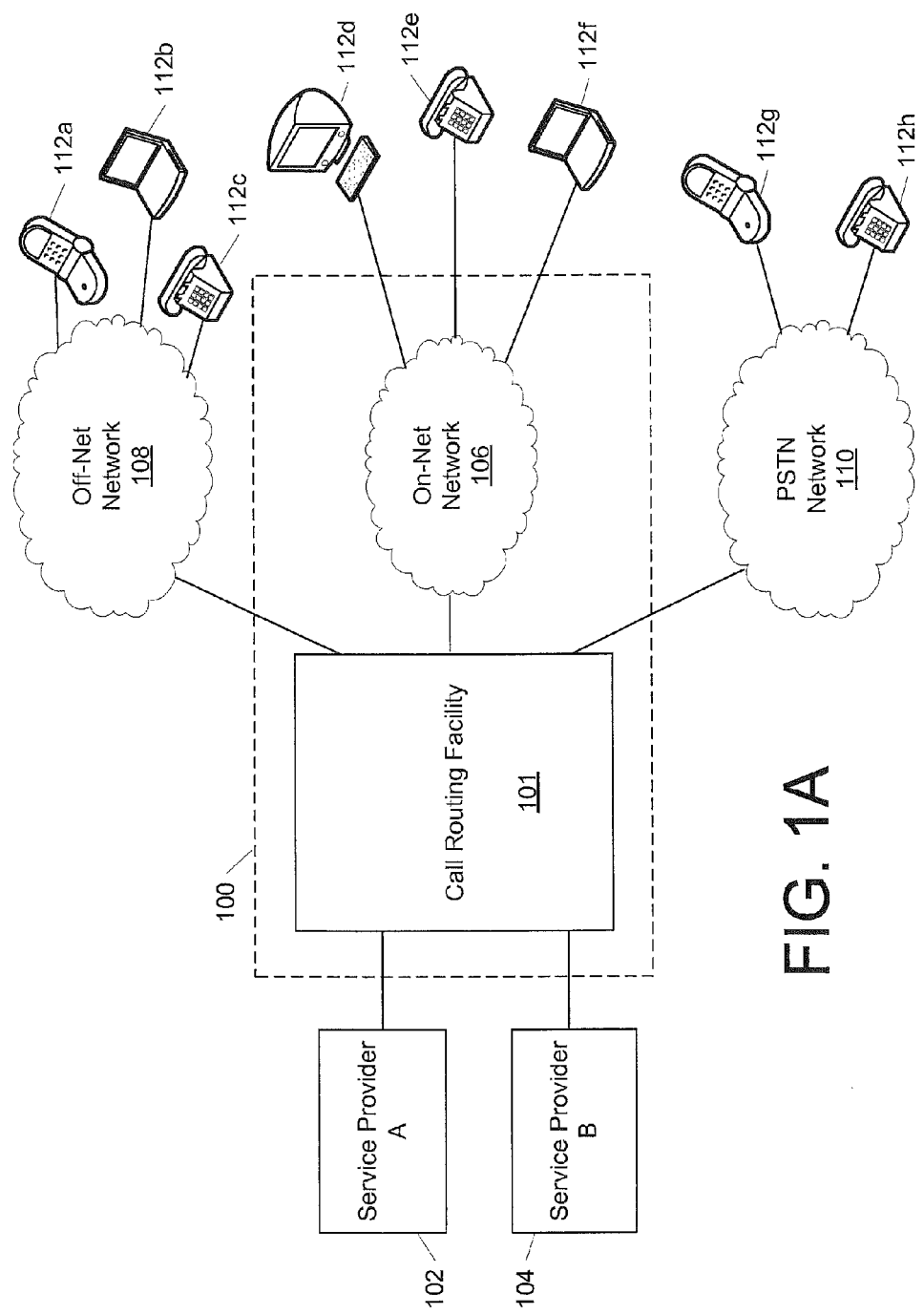
FIG. 1A illustrates an example network through which calls may be routed according to one or more aspects described herein.

FIG. 1A illustrates an example network though which calls may be routed. The network may include multiple portions including, for example, a public switched telephone network (PSTN) 110, off-net network 108, and on-net network 106. On-net and off-net networks may be any type of network such as a digital network, coaxial cable networks, optical fiber networks, hybrid fiber/coax networks (HFC), cellular telephone wireless networks, local wireless networks (e.g., WiMAX), satellite networks, etc. Networks 110, 108 and 106 may be dedicated telephone or voice communication networks, or networks also carrying other data and content, such as video signals, packetized data, and/or Internet Protocol (IP) data.

In one or more arrangements, networks 108 and 106 may distribute digitized voice communication over communication lines of the respective network. In one or more configurations, networks 108 and 106 might only be accessible by users of a service provider 100 (e.g., users, subscribers, and/or customers of the service provider 100); however, the network may be accessible by non-subscribing users. For example, the network illustrated in FIG. 1A may route calls, via the networks 110, 108 and/or 106, or any combination thereof, to one or more communication devices (e.g., communication devices 112 of networks 110, 108 and 106, such as personal computer (PC) 112d, laptop computer 112b and 112f; mobile communication device 112a and 112g; and telecommunication devices 112c, 112e and 112h) using a call routing facility 101. Generally, communications devices can include, for example, a television, a set-top box (STB), a digital video recorder (DVR), a computer server, a personal computer, laptop computer, tablet computer, wireless devices (wireless laptops and netbooks, mobile phones, mobile televisions, personal digital assistants (PDA), etc.), a stationary telephone (e.g., wired or hard-wired telephone), and any other desired device.

In one or more arrangements, on-net network 106 may be a network operated by the service provider 100. For example, on-net network 106 may use a series of interconnected communication lines (e.g., coaxial cables, optical fibers, wireless, etc.) to connect multiple user devices to a central office of the servicer provider 100. The central office of the service provider 100 may transmit downstream information signals onto the lines of the network 106, and each home may have a receiver used to receive and process those signals. There may be one or more lines originating from the central office of the service provider 100, and each may be split a number of times to distribute the signal from the central office. The network 106 may include components not illustrated, such as splitters, filters, amplifiers, etc. to help convey the signal clearly.

Additionally, in some arrangements, off-net network 108 may be a network operated by another service provider (e.g., a third-party service provider, such as a third-party wholesale carrier, a third-party telephony carrier, etc.); however, generally, off-net network 108 may not be under the control of service provider 100. Off-net network 108 may include components that are the same as or similar to on-net network 106.

In one or more embodiments, the calls to be routed via the call routing facility 101 may originate from another source, such as another service provider (e.g., service provider A 102, service provider B 104, etc.) Generally, another service provider can be a wholesale carrier, telephony carrier, voice-over Internet Protocol (VoIP) carrier, etc. Additionally, service provider A 102 and service provider B 104 may provide different services from each other. For example, service provider A 102 may be a wholesale VoIP carrier, while service provider B may be an international voice carrier. Each service provider may have established an arrangement or agreement with service provider 100 which specifies one or more rules for handling, routing, and/or processing calls that originate from the another service provider (e.g., service provider A 102, service provider B 104, etc.).

Figure 1B:
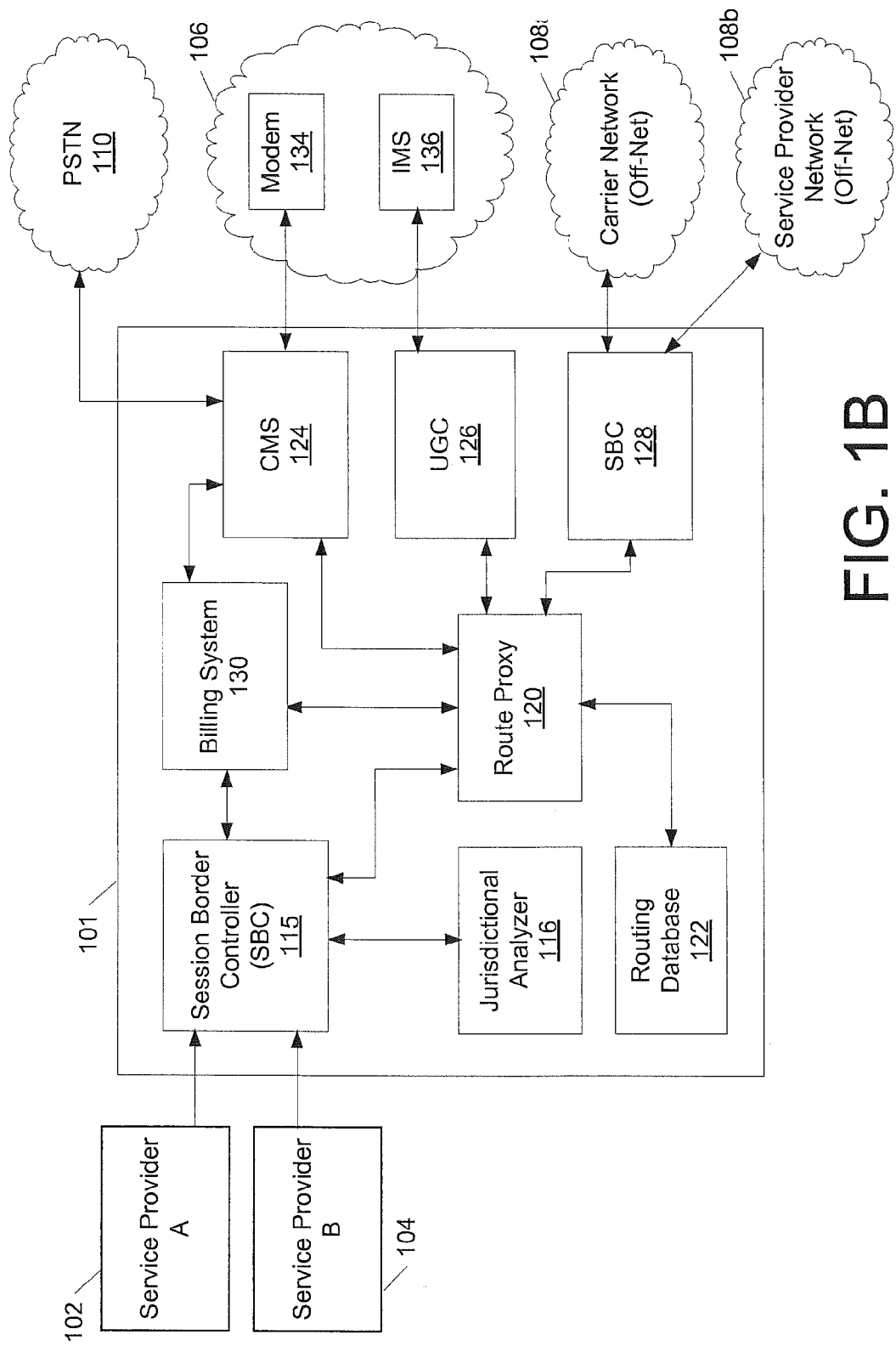
FIG. 1B illustrates an example system configured to route calls according to one or more aspects described herein.

FIG. 1B illustrates an example system configured to route calls. Specifically, FIG. 1B illustrates an example system of call routing facility 101 in FIG. 1A. Referring to the example system of FIG. 1B, the call routing facility 101 may include a session border controller (SBC) 115, a jurisdictional analyzer 116, one or more route proxies (e.g., route proxy 120), routing database 122, billing system 130, and one or more destination interface devices such as call management server (CMS) 124, SBC 128, and/or user generated content server (UGC) 126. As illustrated in FIG. 1B, the components of call routing facility 101 may communicate with each other and/or with other devices (e.g., PSTN 110, on-net network 106, off-net network 108*a* and 108*b*, service provider A 102, and service provider B 104). The devices of FIG. 1B may be configured to communicate using one or more Internet Protocol-based communication protocols, such as session initiation protocol (SIP) or extensible messaging and presence protocol (XMPP). The details of an example embodiment utilizing SIP will be discussed below.

For example, SBC 115 may be configured to receive a call session (e.g., a call session initiation request), process the received request, transmit call information to a jurisdictional analyzer (e.g., jurisdictional analyzer 116), select a route proxy from the one or more route proxies of the call routing facility 101, transmit the request and/or other information about the call to the selected route proxy (e.g., route proxy 120), and/or interface with a billing system of the service provider (e.g., billing system 130). In some arrangements, the SBC 115 may operate in a Peering Point of Presence (POP), or the like.

Jurisdictional analyzer 116 may be configured to analyze call information, and/or transmit results of the analysis to an SBC (e.g., SBC 115). The jurisdictional analyzer 116 may provide for dynamic analysis of the call information. For example, the jurisdictional analyzer 116 may analyze for a call type based on an originating number of the call, a destination number of the call using dynamic mappings, rules and/or other information. The mappings, rules and/or other information of the jurisdictional analyzer may be based on the routing database (e.g., the definition of one or more rules and/or mappings is dependent on the organization of the routing database). In some embodiments, the jurisdictional analyzer 116 may operate as a SIP listener, or the like.

Route proxy 120 may be configured to create a query for a routing database, transmit the query to a routing database (e.g., routing database 122), analyze routing information received from the routing database, and/or forward information related to the call to a destination interface device (e.g., CMS 124, UGC 126, SBC 128, etc). Additionally, routing proxy 120 may be configured to interface with a billing system of the service provider (e.g., billing system 130). In some arrangements, the route proxy may operate as a SIP routing proxy.

The routing database 122 may be configured to receive a query, access information responsive to the query, and/or transmit routing information responsive to the query. The routing database 122 contains routing information, such as routing tables (e.g., least cost routing tables) and policies, that allows the routing proxy to proceed with routing the call to its destination. In one or more embodiments, the routing database 122 may be an intelligent routing database, such as an ENUM database.

Billing system 130 may be configured to receive information, such as a call detail record (CDR) and/or a call log, from an SBC (e.g., SBC 115), a routing proxy (e.g., route proxy 120), and/or a CMS (e.g., CMS 124) in order to perform billing mediation based on the call. In some arrangements, communications to/from the billing system 130 may use file transfer protocol (FTP).

Destination interface devices of the call routing facility 101 (e.g., call management server (CMS) 124, user generated content server (UGC) 126, SBC 128, etc.) may be configured to receive and/or transmit information from a route proxy (e.g., route proxy 120), and/or interface with a downstream network to route the call.

For example, the destination interface devices may interface with devices of PSTN 110, on-net network 106, and off-net network 108*a* and 108*b* in order to route the calls to the user devices. In one example, UGC 126 may interface with devices of on-net network 106 including Internet Protocol (IP) Multimedia Subsystem (IMS) 136, in order to route calls to downstream user devices. The IMS 136 may be configured to manage one or more services, and operations of the services, offered by the service provider over network 106. In another example, CMS 124 may interface with devices of on-net network 106 including modem 134. Modem 134, in some embodiments, may be an embedded multimedia terminal adapter (eMTA). In yet another example, CMS 124 may interface with devices of the PSTN 110 including a PSTN gateway (not shown), which may be configured to process communications to and from a public switched telephone network 110. In another example, SBC 128 may interface with devices of off-net networks 108*a* and 108*b*, such as one or more communication gateways (not shown), which may be configured to process and manage communications over the third-party networks.

In some arrangements, call routing facility 101 may be centrally located at a central office of the service provider (e.g., a single location). In other arrangements, the functions of the call routing facility 101 may be distributed throughout the network of the service provider. For example, SBC 115 and the destination interface devices may be at different locations remote from each other. Additionally and/or alternatively, the one or more route proxies may be at different locations (e.g., first route proxy services destination interface devices at a first location, and second route proxy services destination interface devices at a second location, etc.). Additionally, in some embodiments, the call routing facility 101, or the distributed system implementing the functions of the call routing facility 101, may utilize a centralized routing database that contains the routing policies and/or routing tables. Each call routing process may utilize the centralized routing database to determine the routing information for the call (e.g., call session).

Figure 2:
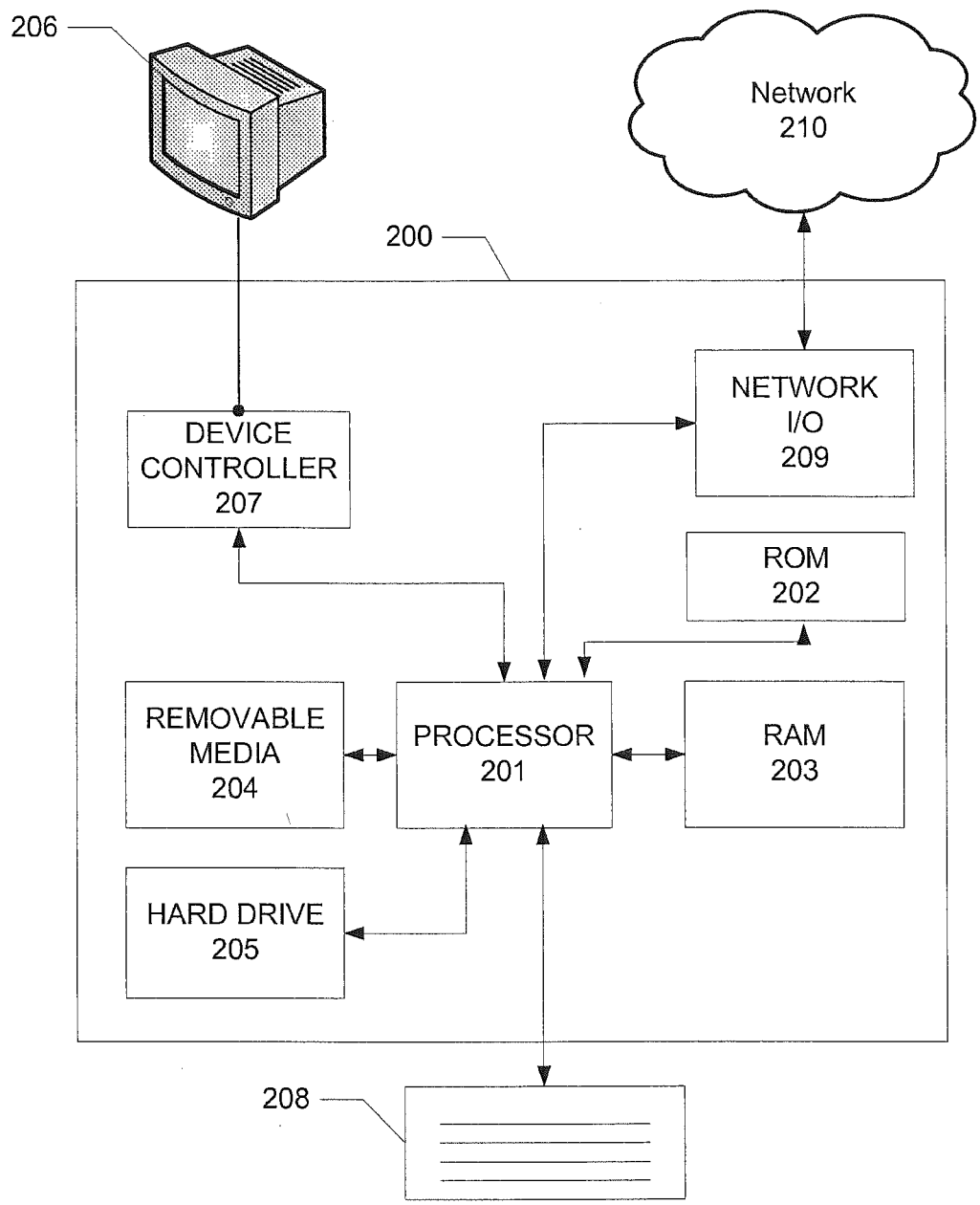
FIG. 2 illustrates an example hardware platform on which the various elements described herein can be implemented.

FIG. 2 illustrates an example hardware platform on which the various elements described herein can be implemented. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication lines of the networks illustrated in FIGS. 1A and 1B, or any other desired network.

The FIG. 2 example is an illustrative hardware configuration. Modifications may be made to add, remove, combine, divide, etc. components as desired. Additionally, the components illustrated may be implemented using basic computing devices and components, and the same components (e.g., processor 201, storage 202, user interface, etc.) may be used to implement any of the other computing devices and components described herein.

One or more aspects of the disclosure may be embodied in computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 3:
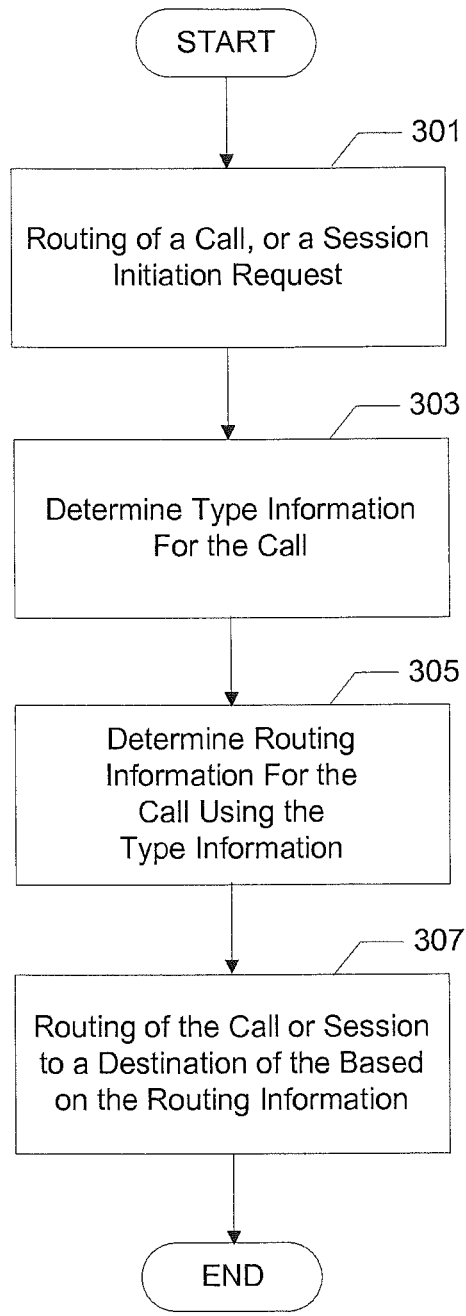
FIG. 3 illustrates an example method for routing calls or call sessions according to one or more aspects described herein.

FIG. 3 illustrates an example method for routing calls and/or call sessions. In one or more arrangements, the example method of FIG. 3 provides an example overview method for a call routing process that can be implemented in a system such as the call routing system illustrated in FIG. 1B. Referring to FIG. 3, at step 301, routing of a call or call session may be initiated or continued. For example, routing of a new call may be initiated or routing of a call already placed may be continued. Step 301 may also occur in response to a request for a call received at a call routing facility of the service provider. Step 301 may also occur as a session initiation request. In one or more arrangements, this can include receiving a session initiation request at a SBC (e.g., SBC 115) from another and/or a remote service provider (e.g., service provider A 102, service provider B 104).

At step 303, type information for the call may be determined by the call routing facility. In one or more embodiments, the type information may include a call type for the call (e.g., local, toll, long distance, international, etc.), a remote service provider type for the call (e.g., information service provider, facilities-based provider, competitive local exchange carrier (CLEC), carrier of IP originated traffic, wholesale carrier, telephony carrier, voice-over Internet Protocol (VoIP) carrier, etc.), and/or an origination number type for the call (e.g., a type identifying the originating number as a number that belongs to the service provider, and/or was licensed/owned/assigned by the service provider; a type identifying the originating number as a number that belongs to another service provider, and/or was licensed/owned/assigned by another service provider; etc.) Other types of information may also be determined at step 303.

At step 305, routing information may be determined for the call using, at least in part, the type information. In one or more embodiments, the routing information may include information related to the next destination of the call (e.g., the next "hop" for the call), such as an address of a destination interface device; information related to the destination number, such as an address and/or routing information for routing the call from the destination interface device to the device associated with the destination number; and/or a listing of possible routes for routing the call (e.g., a listing of routing information that can be sequentially attempted until the call is successfully established by the destination interface device).

At step 307, the call (or session initiation request) may be routed to its destination, or further routing may be caused, based on the routing information. In one or more arrangements, the routing of the call may include forwarding information related to the call, such as routing information, to a destination interface device that services the destination for the call. In some instances, the destination interface device can then establish a connection with the device based on the forwarded information to establish the call and complete the routing process.

Figure 4:
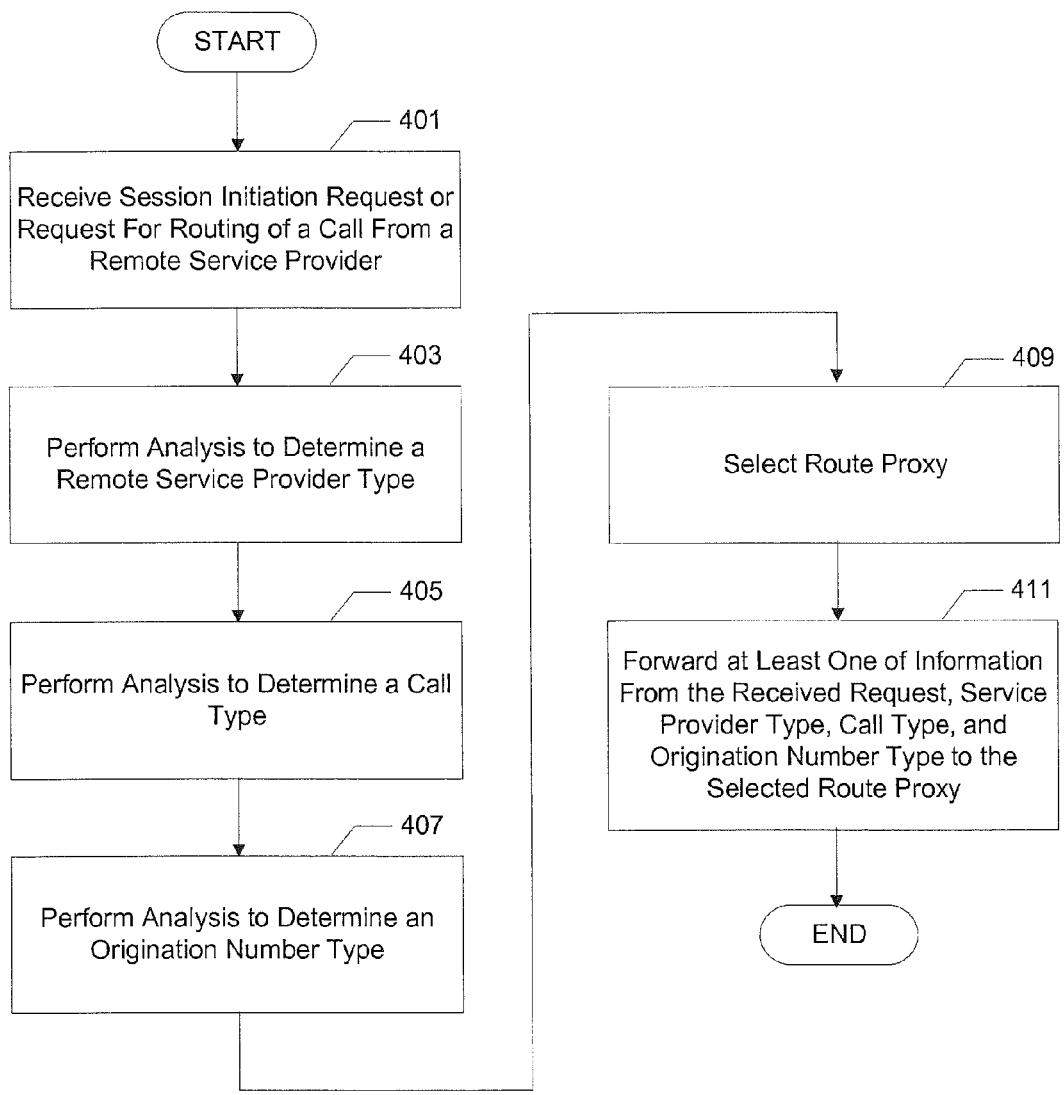
FIG. 4 illustrates an example method for receiving a request for a call session and determining type information for the call session according to one or more aspects described herein.

FIG. 4 illustrates an example method for receiving a call session (e.g., a session initiation request, etc.) and determining type information for the call. In some arrangements the operations and functions illustrated in FIG. 4 may be performed by an SBC (e.g., SBC 115 of FIG. 1B) and/or a jurisdictional analyzer (e.g., jurisdictional analyzer 116 of FIG. 1B) of the call routing facility. At step 401, a call routing facility (e.g., of the service provider) may receive a session initiation request, a request for a call or a request to route a call from a remote service provider (e.g., another service provider, such as service provider A 102 or service provider B 104 of FIG. 1B). In one or more arrangements the received request may be a SIP invite message received at an SBC (e.g., SBC 115 of FIG. 1B) of the call routing facility. Among other information, the SIP invite message may include information identifying an origination number (or address) of the call, and a destination number (or address) of the call. In other words, the SIP invite message may include information identifying the number of the calling device and information identifying the number the calling device wishes to call.

At step 403, the call routing facility may perform an analysis, such as service provider type analysis, to determine a remote service provider type. In some arrangements, the SBC may perform the service provider type analysis. For example, the service provider type analysis may include determining an identifier for the remote service provider that sent the SIP invite message to the SBC. The identifier can be identified from a parameter of the SIP invite message and/or other information received at the SBC from the remote service provider (e.g., other data from a packet that included the SIP invite message, etc.). In some instances, the determined identifier may be an address, such as an IP address of the remote service provider, or some other identifier, such as a unique alphanumeric character string. From this identifier, the SBC may access mapping information (e.g., information stored at the SBC) that maps the identifier to a remote service provider type. The remote service provider type identifies the type of service provider, such as whether the remote service provider is an information service provider, facilities based provider, competitive local exchange carrier (CLEC), IP originated traffic, etc. In one example, the remote service provider type may be a character string, such as "ISP_ORIG" for an information service provider, or "CLEC_ORIG" for a CLEC.

At step 405, the call routing facility may perform an analysis, such as call type analysis, to determine a call type. In some embodiments, the call type analysis may involve the SBC (e.g., SBC 115 of FIG. 1B) and the jurisdictional analyzer of the call routing facility (e.g., jurisdictional analyzer 116 of FIG. 1B). For example, the SBC may forward the SIP invite message received in step 401 (or another message similar to the received SIP invite message) to the jurisdictional analyzer of the call routing facility. The jurisdictional analyzer may analyze the received message to determine a call type. In some arrangements the jurisdictional analyzer extracts the originating number of the call and the destination number of the call from the received message, and using dynamic mappings, rules and/or other information, determines the call type for the call involving the originating number and the destination number. The call type identifies the type of call, such as whether the call is a local call, a toll call, an international call, a long distance call, etc. In one example, the call type may be a character string, such as "LOCAL" for a local call, "LD" for a long distance call, "TOLL" for a toll call, "INTERNATIONAL" for an international call, etc.

The call type for a call involving a particular pair of origination and destination numbers can change based on many different conditions. Some of the conditions that affect the call type include the numbers themselves (e.g., area code of the number), a current location of the originating device associated with the originating number (e.g., is the device local, international, etc.), a current location of the destination device associated with the destination number (e.g., is the device local, international, etc.), a service plan associated with the originating number and/or destination number, etc. The mappings, rules and/or other information used by the jurisdictional analyzer in determining the call type may be based on these different conditions (e.g., a mapping and/or rule determines a current location for the device and determines the call type based on the current location, etc.).

Upon determining the call type, the jurisdictional analyzer may transmit the call type back to the SBC. For example, the call type may be included in a SIP 302 message, which is transmitted to the SBC. In one or more arrangements, the call type may be included in a trunk group parameter ("tgrp" parameter).

At step 407, the call routing facility may perform an analysis, such as origination number type analysis, to determine an origination number type. In some embodiments, the origination number type analysis may involve the SBC (e.g., SBC 115 of FIG. 1B) and the jurisdictional analyzer of the call routing facility (e.g., jurisdictional analyzer 116 of FIG. 1B). For example, the SBC may include the remote service provider type in a message sent to the jurisdictional analyzer (e.g., the SIP invite sent in step 405). The jurisdictional analyzer may extract the originating number of the call and/or the remote service provider type, and using dynamic mappings, rules and/or other information, determine the origination number type for the call. The origination number type identifies the type of origination number, such as whether the originating number is a number that belongs to the service provider, or the originating number is a number that belongs to another service provider, etc. In one example, the origination number type may be a character string, such as "SP_NUM" for a number that belongs to the service provider, or "OP_NUM" a number that belongs to another service provider, etc.

For example, the service provider may license various numbers (or addresses) that the service provider owns (e.g., is legally allocated) to a remote service provider (e.g., service provider A 102 of FIG. 1B). These licensed numbers may be routed according to a particular routing policy. Other numbers, however, may not belong to the service provider (e.g., be owned/licensed/assigned by the service provider). These other numbers may be routed according to different routing policies. In one instance, the routing policies for the other numbers may be based on agreements or arrangements with the service provider and/or the actual owner of the other numbers. Additionally, other regulations may shape the particular routing policies for the originating numbers. Thus, the origination number type may allow for easier access to the routing policies associated with a particular originating number.

Upon determining the origination number type, the jurisdictional analyzer may transmit the origination number type back to the SBC. For example, the origination number type may be included in a SIP 302 message (e.g., the same message discussed above with respect to step 405), which is transmitted to the SBC. In one or more arrangements, the origination number type may be included in a trunk context parameter ("trunk-context" parameter), or the carrier identification code parameter ("cic" parameter).

At step 409, the call routing facility may select a route proxy. In one or more embodiments, the call routing facility may select a route proxy from the one or more route proxies of the call routing facility based on the results of the analyses performed in steps 403, 405 and/or 407. For example, the SBC of the call routing facility may select the routing proxy based on the call type (e.g., the value of the "tgrp" parameter in the SIP 302 message). A routing proxy may be assigned with handling routing processes of particular call types. Therefore, the SBC may compare the call type to the assignments of the available routing proxies, identify one or more matching routing proxy, and select one of the matching routing proxies. Similar selections may be performed based on the origination number type and/or the service provider type, either alone, or in any combination with each other and/or the call type. Different route proxies may be selected for a common service provider type. Other selection algorithms are also possible, including load balancing techniques (e.g., select the route proxy having the least processing load), round-robin techniques, etc.

At step 411, the call routing facility may forward at least one of information from the received request (e.g., the request received in step 401 of FIG. 4, such as a session initiation request, a request for a call, a request to route a call, etc.), the service provider type, the call type, and the origination number type to the selected route proxy. This may allow for the call routing process to continue at the route proxy. In one example, the SBC may send a SIP invite message that is the same as or similar to the received SIP invite message to the selected route proxy (e.g., route proxy 120 of FIG. 1B). As another example, the SBC may copy information from the session initiation request into a SIP invite message and insert the call type and origination number type into the SIP invite message (e.g., insert the "tgrp" parameter and the "trunk-context" parameter, and their associated values, of the SIP 302 message received from the jurisdictional analyzer). This SIP invite message, which in addition to the call type and origination number types, includes the same or similar information as the session initiation request (e.g., the SIP invite message received at step 401), may be transmitted to the selected route proxy (e.g., route proxy 120 of FIG. 1B). As yet another example, the SBC may copy the information of the session initiation request into a SIP invite message and insert the service provider type into a "cic" parameter of the SIP invite message. This SIP invite message may be transmitted to the selected route proxy (e.g., route proxy 120 of FIG. 1B).

Figure 5:
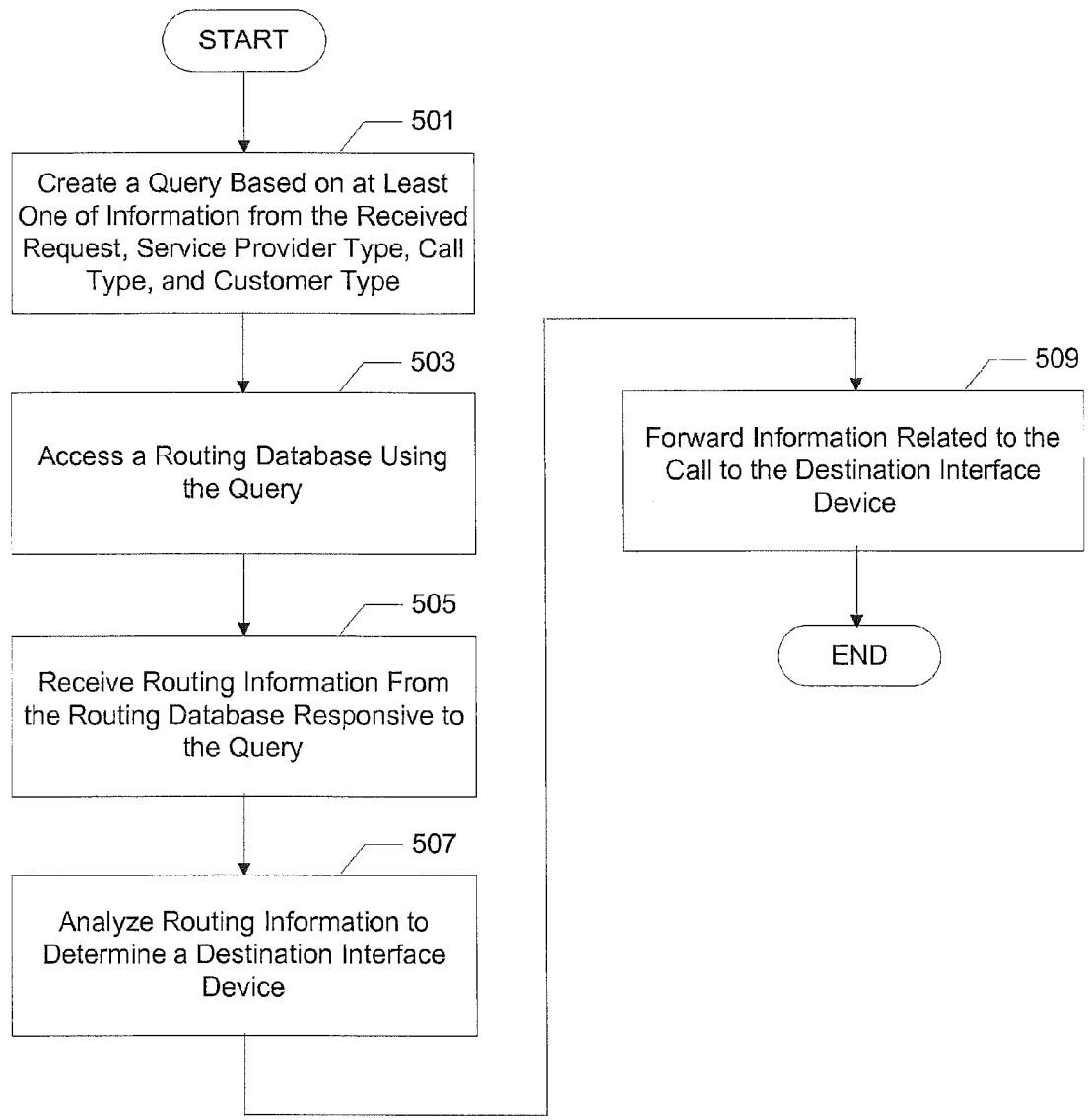
FIG. 5 illustrates an example method for determining routing information for a call using type information and causing the call to be routed according to one or more aspects described herein

FIG. 5 illustrates an example method for determining routing information for a call using type information and causing the call to be routed. In some arrangements the operations and functions illustrated in FIG. 5 may be performed by a route proxy (e.g., route proxy 120 of FIG. 1B) and/or a routing database (e.g., routing database 122 of FIG. 1B) of the call routing facility.

At step 501, the call routing facility may create a query based on at least one of the information from the received request (e.g., the request received in step 401 of FIG. 4, such as a session initiation request, a request for a call, a request to route a call, etc.), the service provider type, the call type and the origination number type. In one or more embodiments, the route proxy of the call routing facility may receive a SIP invite message from the SBC of the call routing facility. In one example, the SIP invite message, as discussed above with respect to FIG. 4, may include one or more of the following: information from the session initiation request (e.g., the destination number), the call type, the service provider type, and/or the origination number type. The route proxy may create a query based on the information included in the SIP invite message received from the SBC. In some embodiments, the routing database may be an ENUM database, and the query may conform to the ENUM protocol and may be used to access the ENUM database.

For example, the route proxy may determine a query that is based on the destination number (or a local routing number), the call type and/or the origination number type. In some embodiments, the route proxy may determine a query that includes the origination number type, the call type, and the destination number. In one instance, the route proxy may combine and/or concatenate with the origination number type and the call type into a single identifier and query the database using the single identifier and the destination number (e.g., a "SP_NUM" origination number type may be combined with a "LOCAL" call type into a "LOCAL_SP_NUM" identifier). A similar combination and/or concatenation could be used in a query that is created based on the destination number, the call type and/or the service provider type (e.g., a "ISP_ORIG" service provider type may be combined with a "LOCAL" call type into a "LOCAL_ISP_ORIG" identifier).

As another example, the route proxy may determine a query that is based on the originating number, the destination number, originating number type, and/or the call type. In some arrangements, the route proxy may use the origination number and/or the destination number information, and optionally additional information, to create/determine a user label. A user label may identify the user (e.g., user, customer, subscriber, etc.) associated with the respective origination number and/or destination number. For example, to create a user label, the route proxy may access mapping information that maps the origination number to the user label. Similar destination number mapping information may also be accessed to create a user label. The route proxy may then create a query that includes the user label and/or the destination number. In one or more arrangements utilizing a user label, the route proxy may convert both the origination number and the destination number to a user label and compare the user labels to each other. If they match, the route proxy may create a query that includes the matching user label and the destination device.

As yet another example, the route proxy may combine the above methods into a single query process. For example, the route proxy may create a query that includes one or more user labels, the origination number type, the call type, and the destination number. Details of how these queries access the database will be discussed below. As another example, the route proxy may first identify the origination number type, if the origination number type identifies the origination number as a number that belongs to the service provider, the route proxy may then proceed to determine a user label in a manner similar to those discussed above.

At step 503, the call routing facility may access a routing database using the query. In one or more arrangements, the routing database may include a plurality of routing tables and/or routing policies. The routing tables may be organized and/or partitioned in the database based on the query being used by the call routing facility (e.g., organized based on origination number type, call type, service provider type, destination number, etc.; partitioned based on customer label, etc.). The manner in which the routing database is accessed depends on the organization/partitioning of the routing database.

Figure 6A:
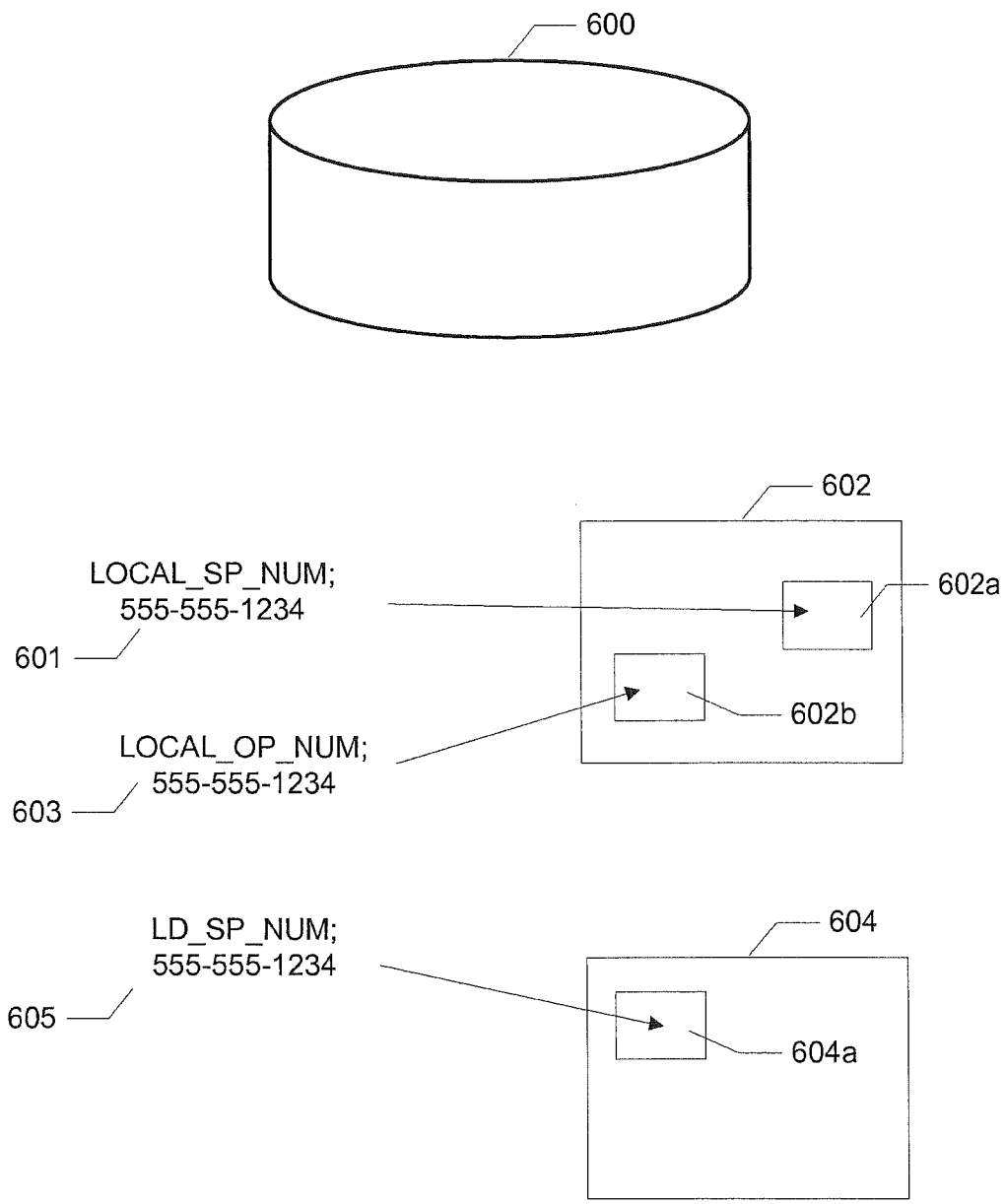
FIGS. 6A and 6B illustrate example scenarios for accessing a routing database according to one or more aspects described herein.
Figure 6B:
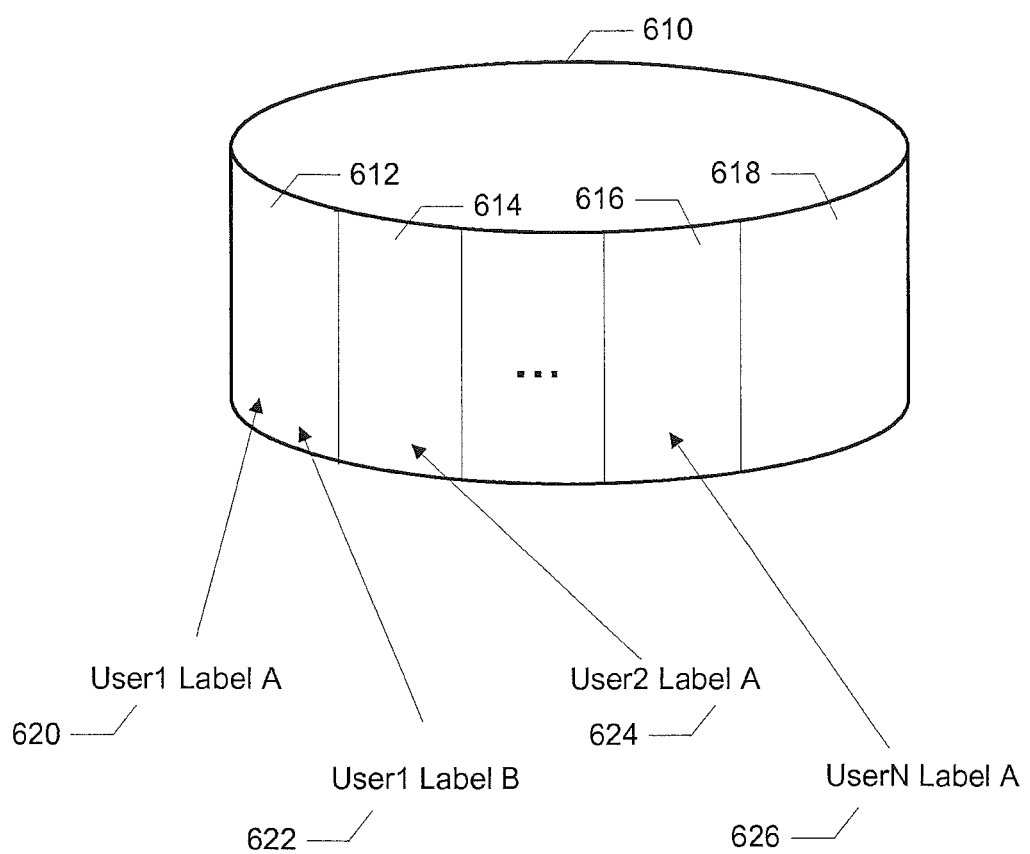

FIGS. 6A and 6B illustrate example scenarios for accessing a routing database. Specifically, FIG. 6A illustrates an example scenario for accessing a routing database according to a query that includes an origination number type, a call type, and a destination number. FIG. 6B illustrates an example scenario for accessing a routing database according to a query that includes a user label.

As illustrated in FIG. 6A, routing database 600 may include a plurality of routing tables (e.g., least cost routing tables) and/or a plurality of routing policies. Particular routing information within the routing tables may be located based on a query. For example, FIG. 6A illustrates three queries for a particular destination number (e.g., destination number 555-555-1234: query 601, which includes a "LOCAL" call type and a "SP_NUM" origination number type; query 603, which includes a "LOCAL" call type, and a "OP_NUM" origination number type; and query 605, which includes a "LD" call type and a "SP_NUM" origination number type. The routing database 600 may be organized in various ways (e.g., by destination number, call type, origination number type, service provider type, some combination thereof, etc.). Generally, the query acts as an index into the database allowing the database to be searched for routing information responsive to the query.

For illustrative purposes, assume routing database 600 is organized based on call type and destination number. Two of the many routing tables within the routing database 600 are illustrated in FIG. 6A: routing table 602, which contains routing information for local calls going to the destination number; and routing table 604, which contains routing information for long distance calls going to the destination number.

Each query may search the routing database 600 for routing information responsive to the query. For example, among the many searched routing tables, query 601 may search routing table 602 and locate routing information 602a. Routing information 602a may be responsive to the query. In one instance, routing information 602a may include information for routing a local call to the destination number from a number that belongs to the service provider (e.g., responsive to query 601). As another example, query 603 may search routing table 602 and locate routing information 602b, which is at a location of the routing table different than the location of routing information 602a. Routing information 602b may include information for routing a local call to the destination number from a number that belongs to another service provider (e.g., responsive to query 603). Similarly, among the many searched routing tables, query 605 may search routing table 604 and locate routing information 604a. Routing information 604a may include information for routing a long distance call to the destination number from a number that belongs to another service provider (e.g., responsive to query 605).

As illustrated in FIG. 6B, routing database 610 may include a plurality of partitions. One or more of the partitions may be accessed based on a user label of a query. For example, FIG. 6B illustrates a plurality of different partitions: partition 612, which includes routing information related to "user1"; partition 614, which includes routing information related to "user2"; partition 616, which includes routing information related to "userN"' and partition 618, which includes other routing information.

Each user may be associated with one or more user labels. When a query includes a user label, the user label may be used to access the routing information (e.g., routing tables and/or routing policies) for the corresponding user. For example, FIG. 6B illustrates four user labels: user label 620, which is a first label for "user1"; user label 622, which is a second label for "user1"; user label 624, which is a first label for "user2"; and user label 626, which is a first label for "userN". User label 620 and user label 622 may be different user labels, even though they are for the same user. For each query that includes a user label, the partition for the user corresponding to the query's user label may be searched for routing information responsive to the query. Additionally and/or alternatively, partition 618 may be searched for routing information responsive to the query (e.g., subsequent to searching for routing information in the partition for the user; only if no routing information is found in the partition for the user; if the query does not include a user label, etc.).

Partitioning by user label may also allow for a virtual private network service to be offered by the service provider via the call routing facility, such as a virtual private network service for another service provider (e.g., service provider A 102 of FIG. 1B, service provider B 104 of FIG. 1B, etc.). For example, if a requested call is between an originating number of user1 and a destination number of user1 (e.g., user1 may be service provider A 102 of FIG. 1B, or some other entity), when the requested call is routed via the call routing facility of the service provider, only the routing information in the partition of user1 is accessed (e.g., partition 612). Additionally, when the call routing facility of the service provider routes another call to and/or from a different user (e.g., a call between an originating number of user1 and a destination number of user2, a call between an originating number of user2 and a destination number of user2, a call between an originating number of user2 and a destination number of userN, etc.), the routing information of user1 (e.g., the information of partition 612) is not accessed. Thus, the routing information of user1 may be kept private from other users by virtue of the labels and different partitions.

In some embodiments, the scenarios illustrated in FIG. 6A and FIG. 6B may be combined (e.g., access via a query including a user label, an origination number type, a call type, and a destination number). For example, the routing database may be partitioned according to the user labels and then the routing tables for the user may be included in the partition for the user. The routing information for a particular call may be accessed by first accessing the partition according to the user label of the query (e.g., the partition for Customer1 612 of FIG. 6B via user label 620 "Customer1 Label A"), and then the routing tables of the partition may be searched according to the remaining portions of the query, such as the origination number type, call type, and the destination number (e.g., search the routing tables for routing information according to the look-up index of "LOCAL_SP_NUM" in the case where the origination number type is for a number that belongs to the service provider).

Referring again to FIG. 5, at step 505, the call routing facility receives routing information from the routing database that is responsive to the query. In one or more arrangements, the received routing information may include information related to the next destination of the call (e.g., the next "hop" for the call), such as an address of a destination interface device; information related to the destination number, such as an address and/or routing information for routing the call from the destination interface device to the device associated with the destination number; and/or one or more possible routes for routing the call (e.g., a listing of routing information that can be sequentially attempted until the call is successfully established by the destination interface device). For example, a call being routed to mobile communication device 112g of FIG. 1A, may include information related to PSTN network 110, a device of PSTN network 110, mobile communication device 112g, and/or CMS 124 of FIG. 1B.

At step 507, the call routing facility analyzes the routing information to determine a destination interface device of the call routing facility. For example, the routing information may identify a destination interface device of the call routing facility (e.g., CMS 124 of FIG. 1B, UGC 126 of FIG. 1B, SBC 128 of FIG. 1B, etc.). The route proxy may determine the destination interface device by searching the routing information for the identification of the destination interface device. As another example, the routing information may include information related to a downstream network (e.g., PSTN 110 of FIG. 1B, on-net network 106 of FIG. 1B, off-net network 108*a* and 108*b* of FIG. 1B) and/or one or more downstream devices of the downstream networks (e.g., modem 134, IMS 136, etc., of FIG. 1B). The route proxy may determine the destination interface device by identifying the downstream network and/or downstream device, and determine which destination interface device services the identified downstream network and/or downstream device (e.g., CMS 124 of FIG. 1B services PSTN 110 and on-net network 106 and/or modem 134, UGC 126 of FIG. 1B services on-net network 106 and/or IMS 136, SBC 128 services off-net network 108*a* and/or 108*b*, etc.).

At step 509, the call routing facility may forward information related to the call to the destination interface device (e.g., CMS 124 of FIG. 1B, UGC 126 of FIG. 1B, SBC 128 of FIG. 1B, etc.). For example, the route proxy of the call routing facility may forward information similar to the session initiation request (or other received request, such as the requests received in step 401 of FIG. 4). Additionally and/or alternatively, the route proxy may forward all or a portion of the routing information to the destination interface device. Upon receipt of the information, the destination interface device may proceed to interface with a device of a downstream network to establish and/or route the call in accordance with the received information (e.g., CMS 124 of FIG. 1B may interface with a device of PSTN 110 or network 106 of FIG. 1B to establish and/or route a call to a particular user device, UGC 126 may interface with a device of network 106 to establish and/or route a call to a particular user device, SBC 128 may interface with a device of network 108*a* or 108*b* to establish and/or route a call to a particular user device).

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A method, comprising:
   receiving, at a computing device of a first service provider, a message associated with a call session from a second service provider that is different from the first service provider;
   creating, based on a user label related to the call session, a query for accessing a partitioned routing database that is partitioned according to a plurality of user labels;
   using the query to retrieve routing information from the partitioned routing database; and
   causing routing of the call session to a destination of the call session based on the routing information.

2. The method of claim 1, further comprising:
   mapping, based on mapping information, an origination number for the call session to the user label.

3. The method of claim 1, further comprising:
   mapping, based on mapping information, a destination number for call session to the user label.

4. The method of claim 1, wherein the query comprises a destination number for the call session.

5. The method of claim 1, further comprising;
   mapping an origination number for the call session to a first mapped user label;
   mapping a destination number for the call session to a second mapped user label;
   determining whether the first mapped user label matches the second mapped user label; and
   wherein creating the query is responsive to determining that the first mapped user label matches the second mapped user label.

6. The method of claim 1, wherein using the query to retrieve routing information from the partitioned routing database comprises:
   using the user label to access a corresponding partition in the partitioned routing database; and
   using one or more portions of the query to search routing tables stored in the corresponding partition to locate the routing information.

7. The method of claim 6, wherein the one or more portions are based on at least one of a service provider type for the second service provider or an origination number type for the call session.

8. The method of claim 1, wherein the partitioned routing database enables a virtual private network service to be offered by the first service provider to a user corresponding to the user label, and the call session is routed as part of the virtual private network service of the first service provider to the user.

9. The method of claim 1, further comprising:
   determining a call type for the call session,
   wherein the query is created further based on the call type.

10. The method of claim 1, further comprising:
    determining a destination interface device of the first service provider based on the routing information;
    forwarding information related to the call session to the destination interface device; and
    interfacing, via the destination interface device, with at least one of the following networks: a public switched telephone network (PSTN), a network of the first service provider, or a network of another service provider.

11. A method, comprising:
    receiving, at a computing device of a first service provider, a message associated with a call session from a second service provider that is different from the first service provider;
    creating a query that comprises a user label related to the call session and one or more portions related to the call session;
    accessing a partitioned routing database based on the query by at least using the user label to access a corresponding partition in the partitioned routing database, using the one or more portions to search routing tables stored in the corresponding partition to locate routing information, and retrieving the routing information from the corresponding partition; and
    causing routing of the call session to a destination of the call session based on the routing information.

12. The method of claim 11, further comprising;
    mapping an origination number for the call session to a first mapped user label;

mapping a destination number for the call session to a second mapped user label;

determining whether the first mapped user label matches the second mapped user label; and wherein creating the query is responsive to determining that the first mapped user label matches the second mapped user label.

13. The method of claim 11, wherein the one or more portions are based on at least one of a service provider type for the second service provider or an origination number type for the call session.

14. The method of claim 11, wherein the one or more portions are based on at least one of a call type for the call session or a destination number for the call session.

15. A method, comprising:

receiving, at a computing device of a first service provider, a request for a call session from a second service provider that is different from the first service provider;

creating a query for accessing a partitioned routing database based on a service provider type for the second service provider;

using the query to retrieve routing information from the partitioned routing database; and causing routing of the call session to a destination of the call session based on the routing information.

16. The method of claim 15, further comprising;

mapping an origination number for the call session to a first mapped user label;

mapping a destination number for the call session to a second mapped user label;

determining whether the first mapped user label matches the second mapped user label; and wherein creating the query is responsive to determining that the first mapped user label matches the second mapped user label.

17. The method of claim 15, wherein the routing database is partitioned according to user labels and the query comprises a user label for the call session and one or more portions based on the service provider type, wherein using the query to retrieve routing information from the routing database comprises:

using the user label for the call session to access a corresponding partition in the routing database; and using the one or more portions of the query to search routing tables stored in the corresponding partition to locate the routing information.

18. A method, comprising:

receiving, at a computing device of a first service provider, a message associated with a call session from a second service provider that is different from the first service provider;

creating a query for accessing a partitioned routing database based on an origination number type for the call session;

using the query to retrieve routing information from the partitioned routing database; and causing routing of the call session to a destination of the call session based on the routing information.

19. The method of claim 18, further comprising;

mapping an origination number for the call session to a first mapped user label;

mapping a destination number for the call session to a second mapped user label;

determining whether the first mapped user label matches the second mapped user label; and wherein creating the query is responsive to determining that the first mapped user label matches the second mapped user label.

20. The method of claim 18, wherein the partitioned routing database is partitioned according to user labels and the query comprises a user label for the call session and one or more portions based on the origination number type, wherein using the query to retrieve routing information from the partitioned routing database comprises:

using the user label for the call session to access a corresponding partition in the partitioned routing database; and using the one or more portions of the query to search routing tables stored in the corresponding partition to locate the routing information.

* * * * *